(12) United States Patent
Hood (10) Patent No.: US 12,525,638 B2
(45) Date of Patent: Jan. 13, 2026

(54) METHOD TO EMBED CERAMIC NANOPARTICLES INTO TRANSPARENT POLYMER MEMBRANES

(71) Applicant: UCHICAGO ARGONNE, LLC, Chicago, IL (US)

(72) Inventor: Zachary David Hood, Bolingbrook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 708 days.

(21) Appl. No.: 17/877,623

(22) Filed: Jul. 29, 2022

(65) Prior Publication Data

US 2024/0039035 A1     Feb. 1, 2024

(51) Int. Cl.
*H01M 10/00*     (2006.01)
*H01M 10/056*     (2010.01)

(52) U.S. Cl.
CPC ............ *H01M 10/056* (2013.01); *H01M 2300/0091* (2013.01)

(58) Field of Classification Search
CPC .......... H01M 10/0525; H01M 50/451; H01M 50/423; H01M 50/417; Y02E 60/10
See application file for complete search history.

(56) References Cited

U.S. PATENT DOCUMENTS

| | | | |
|---|---|---|---|
| 3,953,234 A | 4/1976 | Hoffmann | |
| 4,774,220 A | 9/1988 | O'Young et al. | |
| 4,849,072 A | 7/1989 | Bowman | |
| 4,973,390 A | 11/1990 | Christini et al. | |
| 5,131,988 A | 7/1992 | Peterson | |
| 7,550,028 B2 | 6/2009 | Riquet et al. | |
| 8,652,690 B2 | 2/2014 | Nunome et al. | |
| 8,741,150 B2 | 6/2014 | Chung et al. | |
| 9,039,885 B1 | 5/2015 | Holland et al. | |
| 2002/0018935 A1 | 2/2002 | Okada | |
| 2005/0100793 A1 | 5/2005 | Jonghe et al. | |
| 2005/0115841 A1 | 6/2005 | Ozawa et al. | |
| 2006/0118424 A1 | 6/2006 | Nomura et al. | |
| 2007/0062336 A1 | 3/2007 | Riquet et al. | |
| 2007/0068382 A1 | 3/2007 | Ku et al. | |
| 2009/0263707 A1 | 10/2009 | Buckley et al. | |
| 2010/0140175 A1 | 6/2010 | Wyse et al. | |
| 2012/0100056 A1 | 4/2012 | Harrison et al. | |
| 2012/0301774 A1 | 11/2012 | Jiang et al. | |
| 2013/0071755 A1 | 3/2013 | Oguro | |
| 2014/0178770 A1 | 6/2014 | Xu et al. | |

(Continued)

FOREIGN PATENT DOCUMENTS

| | | | | |
|---|---|---|---|---|
| CN | 106702441 A | | 5/2017 | |
| KR | 20160058121 A | * | 5/2016 | ........ H01M 10/0525 |
| KR | 20200002235 A | | 1/2020 | |

OTHER PUBLICATIONS

Shi et al., Porous Membranes Filled With Nano-Particles and Related Methods, May 2016, See the Abstract., (Year: 2016).*

(Continued)

*Primary Examiner* — Tiffany Legette
*Assistant Examiner* — Monique M Wills
(74) *Attorney, Agent, or Firm* — Foley & Lardner LLP (57) ABSTRACT

A polymer-ceramic composite membrane and methods of making the same. The composite membrane includes a polymer scaffold and a ceramic nanoparticle disposed within the polymer scaffold.

7 Claims, 5 Drawing Sheets

(56) References Cited

U.S. PATENT DOCUMENTS

| | | |
|---|---|---|
| 2014/0199577 A1 | 7/2014 | Bhavaraju |
| 2014/0246307 A1 | 9/2014 | Dadasaheb et al. |
| 2015/0014184 A1 | 1/2015 | Swonger |
| 2015/0132633 A1 | 5/2015 | Joshi |
| 2015/0197830 A1 | 7/2015 | Chon et al. |
| 2016/0164092 A1 | 6/2016 | Stottlemyer et al. |
| 2016/0254560 A1 | 9/2016 | Aetukuri et al. |
| 2016/0315313 A1 | 10/2016 | Suzuki et al. |
| 2016/0351889 A1 | 12/2016 | Swonger et al. |
| 2017/0001174 A1 | 1/2017 | Han et al. |
| 2017/0025658 A1 | 1/2017 | Shi et al. |
| 2017/0203256 A1 | 7/2017 | Chen et al. |
| 2018/0371632 A1 | 12/2018 | Bodoin et al. |
| 2019/0190005 A1 | 6/2019 | Lee et al. |
| 2019/0198837 A1* | 6/2019 | Yushin ............... H01M 50/44 |
| 2019/0226109 A1 | 7/2019 | Park et al. |
| 2019/0334147 A1 | 10/2019 | Hamamoto et al. |
| 2019/0348668 A1 | 11/2019 | Kim et al. |
| 2020/0086281 A1* | 3/2020 | Hryn ............... B01D 67/00416 |
| 2020/0353426 A1 | 11/2020 | Kawashima et al. |
| 2022/0293929 A1 | 9/2022 | Ito et al. |

OTHER PUBLICATIONS

He, et al., "The intrinsic behavior of lithium fluoride in solid electrolyte interphases on lithium," Proceedings of the National Academy of Sciences 117(1). pp. 73-79 (2019).

Kim, et al., "Facet selectivity of Cu current collector for Li electrodeposition," Energy Storage Materials 19, pp. 154-162 (2019).

Ma, et al., "Facile and scalable electrodeposition of copper current collectors for high-performance Li-metal batteries," Nano Energy 59, pp. 500-507 (2019).

Boulfrad, et al., "Electrochemical characterization of nanostructured zirconias," Solid State Ionics 180(14-16), pp. 978-983 (2009).

Shimonishi, et al., "Synthesis of garnet-type Li7-xLa3Zr2O12-1/2x and its stability in aqueous solutions," Solid State Ionics 183(1), pp. 48-53 (2011).

Stalin, et al., "Designing Polymeric Interphases for Stable Lithium Metal Deposition," Nano Letters 20(8), pp. 5749-5758 (2020).

Chang, et al., "Morphological and Chemical Mapping of Columnar Lithium Metal," Chemistry of Materials 32(7), pp. 2803-2814 (2020).

Lopez, et al., "Effects of Polymer Coatings on Electrodeposited Lithium Metal," Journal of the American Chemical Society 140 (37), pp. 11735-11744 (2018).

Kazyak, et al., "Atomic Layer Deposition of the Solid Electrolyte Garnet Li7La3Zr2O12," Chemistry of Materials 29(8), pp. 3785-3792 (2017).

Kim & Van Der Bruggen, "The use of nanoparticles in polymeric and ceramic membrane structures: Review of manufacturing procedures and performance improvement for water treatment," Environmental Pollution 158(7), pp. 2335-2349 (2010).

Liang, et al., "Polymer Nanofiber-Guided Uniform Lithium Deposition for Battery Electrodes," Nano Letters 15(5), pp. 2910-2916 (2015).

Mashtalir, et al., "High-Purity Lithium Metal Films from Aqueous Mineral Solutions," ACS Omega 3(1), pp. 181-187 (2018).

Munnik, et al., "Recent developments in the synthesis of supported catalysts," Chemical Reviews 115(14), pp. 6687-6718 (2015).

Qian, et al., "Dendrite-free Li deposition using trace-amounts of water as an electrolyte additive," Nano Energy 15, pp. 135-144, 2015.

Shah, et al., "3D printing of electrically conductive hybrid organic-inorganic composite materials," Microsystem Technologies , 5 pages (2018).

Tarascon & Armand, "Issues and challenges facing rechargeable lithium batteries," Nature 414, pp. 359-367 (2001).

Wilson, et al., "Recycling of aluminium-lithium process scrap," Journal de Physique Colloques 48(C3), pp. C3-75-C3-83 (1987).

Zhang & Itoh, "Extraction of metals from municipal solid waste incinerator fly ash by hydrothermal process," Journal of Hazardous Materials 136(3), pp. 663-670 (2006).

Zhang, et al., "Dendrite-free lithium deposition with self-aligned nanorod structure," Nano Letters 14, pp. 6889-6896, 2014.

Zhang, et al., "Dendrite-Free Lithium Deposition with Self-Aligned Nanorod Structure," Nano Letters 14(12), pp. 6889-6896 (2014).

Zheng, et al., "PolymerNanofiber-Guided Uniform Lithium Deposition for Battery Electrodes," Nano Letters 15, pp. 2810-2916, 2015.

Guo, et al., "Vinylene carbonate—LiNO3: A hybrid additive in carbonic ester electrolytes for SEI modification on Li metal anode," Electrochemistry Communications 51, pp. 59-53 (2015).

* cited by examiner

METHOD TO EMBED CERAMIC NANOPARTICLES INTO TRANSPARENT POLYMER MEMBRANES

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates generally to a method for producing a polymer-ceramic composite membranes. More specifically, the present disclosure describes methods for and compositions of a polymer-ceramic composite membranes.

BACKGROUND

Ceramics and polymers are two main candidates for membranes. The majority of membranes has been made of polymeric materials because of advantages in manufacturing including low cost, easy processing, and tenability in pore configurations. On the other hand, ceramic materials exhibit superior performance including long service life, mechanical robustness, and high thermal and chemical stabilities. For these reasons, ceramic materials are used for various applications in gas, petrochemicals, food-beverage, and pharmaceutical industries where polymeric membranes cannot perform properly. Yet, the cost of using ceramic membranes is significantly higher than using polymeric membranes. Polymer-ceramic composite membranes can provide improved membrane performance at a low cost, and play an important role in a number of applications ranging from energy storage, separation technology, and catalysis. For emerging applications, ranging from smart windows, sensing, building material coverings, lenses, etc., industry seeks to form polymers that are mechanically robust, optically transparent, and, in some cases, ionically conductive. The ability to process polymer-ceramic composites as transparent and robust membranes opens a number of new applications.

SUMMARY

Certain embodiments described herein relate generally to a polymer-ceramic composite membrane. The membrane comprises a polymer scaffold; and a polymer-coated ceramic nanoparticle disposed within the polymer scaffold.

Certain embodiments described herein relate generally to a method of making a polymer-ceramic composite membrane. The method comprises forming a polymer scaffold having a plurality of through-pores; forming a ceramic nanoparticle/polymer composite; and integrating the ceramic nanoparticle/polymer composite into the polymer scaffold.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are not, therefore, to be considered limiting of its scope, the disclosure will be described with additional specificity and detail through use of the accompanying drawings.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

As used herein "room temperature" shall mean temperatures within 15 to 40° C.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

Figure 1:
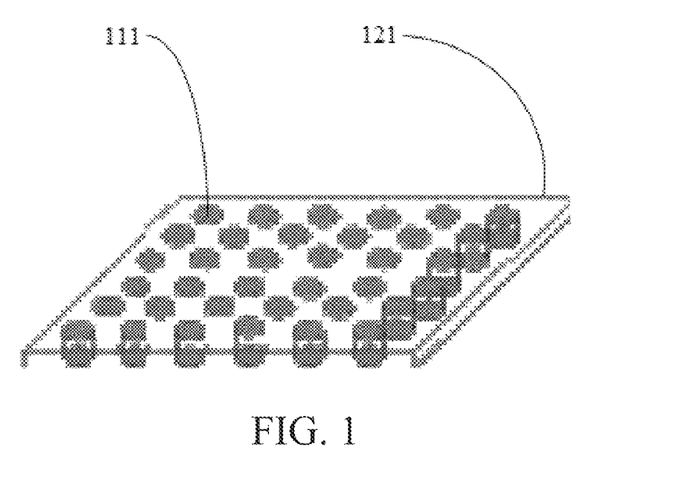
FIG. 1 shows a schematic of one embodiment of a polymer-ceramic composite membrane featuring a polymer scaffold containing an array of ceramic nanoparticle columns.

In one embodiment, a polymer-ceramic composite membrane comprises a polymer scaffold. FIG. 1 illustrates one embodiment of an ideal structure for the polymer-ceramic composite membrane, which includes a polymeric scaffold or support 121 that contains an array of ceramic nanoparticles 111. The polymer mesh imparts flexibility, impermeability and stability in both aqueous and organic media, and has high dielectric stability. In some embodiments, the polymer scaffold 121 may be comprised of polypropylene ("PP"), thermoplastic polyurethane ("TPU"), polyethylene ("PE") including low density polyethylene ("LDPE"), high density polyethylene ("HDPE"), polystyrene ("PS"), polyethylene oxide ("PEO"), polyethylene glycol ("PEG"), polyvinyl difluoride ("PVDF"), epoxy, polyacrylonitrile, polyvinylchloride ("PVC"), polyimide including nylon 6 and nylon 66, polytetrafluoroethylene ("PTFE"), polysiloxane, and polyphosphane, and derivatives, composites, and combinations thereof. In one embodiment, the columns of ceramic nanoparticles comprise solids and may be a monolithic piece, such as a single particle or may be a plurality of interconnected particles. In some embodiments, the interconnected particles are nanoparticles. In some embodiments, the ceramic nanoparticles may directly span the polymer network in a linear fashion or traverse in a nonlinear path, so long as they form linear or nonlinear "channels" of lithium ion transport from anolyte to catholyte.

Many lithium ion conductors reported in literature require some form of heat-treatment either from sol-gel methods or from molten glass reactions. Elevated temperatures, however, are not expected to be compatible with the polymer-based frame described above. The hybrid ceramic-polymer membrane is fabricated through room-temperature synthesis and integration of the ion conducting solid into the polymeric frame. In one embodiment, the hybrid ceramic-polymer membrane is a porous polymer matrix filed with lithium ion conducting ceramic particles and impermeable to the aqueous and organic electrolytes.

In one embodiment, a polymer scaffold is a porous polymer scaffold having the necessary aligned columns (pores) to accommodate ceramic nanoparticles. In some embodiments, the ceramic nanoparticles may be exposed on both sides. In one example, a porous polymer scaffold may be 3D printed. In other examples, other printing methods such as polymer pen lithography or dip pen lithography may be utilized. Further in other examples, other synthesis methods such as polymer extrusion, track etching, stretching, or phase-separation, or any combination of the aforementioned methods may be utilized.

The average size of the pores of the polymer scaffold will be dictated by the particulate size of the ceramic nanoparticle that will be used. In some embodiments, the size of the pores may have diameter of 10-5000 nm. In some embodiments, the pores may have diameter of 10-500 nm. In some embodiments, the pore may have diameter of 70-320 nm. While, the pores need not be perpendicular to the membrane cross-section, slanted pores lead to longer diffusion times for the lithium ions. For some applications, it is desirable to have as high a pore density as possible to ensure sufficient rates of lithium ion replenishment. Pore densities will inversely depend on the pore size. Thus, for some applications, smaller diameters of the pores may be desirable.

Figure 2:
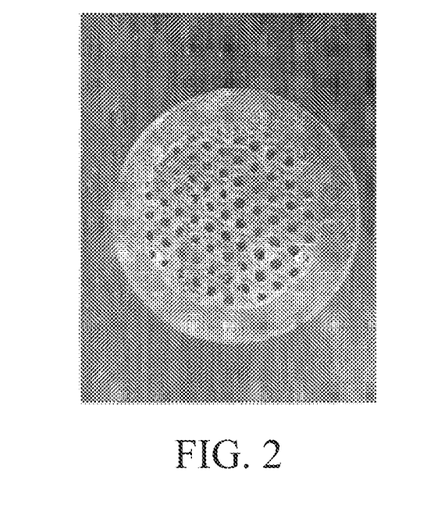
FIG. 2 illustrates an embodiment of a polymer scaffold that was 3D printed.

The average center-to-center distance will be limited by the printing technique, but generally would be preferred to be the minimum width allowable for the printed porous polymer scaffold to maintain structural support. A 3D printer may be employed for the preparation of such a membrane to ensure uniformity and to achieve a close-packed array of the ion conducting components, while allowing for excellent control of membrane dimensions (size of overall piece, diameter of inorganic columns, etc.). FIG. 2 show one embodiment of 3D printed polymer scaffold, not yet loaded with a solid ceramic nanoparticle. Specifically, FIG. 2 shows a top down view of one embodiment of a 3D printed membrane.

In one embodiment, the porous polymer scaffold can be 3D-printed first, followed by embedding the ceramic nanoparticles. The ceramic nanoparticles may be embedded in a form of ceramic nanoparticle/polymer composite. In one embodiment, ceramic nanoparticle/polymer composite is formed by a method of FIG. 3. In some embodiments, the polymer may be urethane. In step 302, ethylene oxide-functionalized monomers are reacted to the surface of ceramic nanoparticles. While the step 302 is carried out at the boiling temperature of ethanol, subsequent steps are to be conducted at a room temperature. In step 304, which may be optional if ionic conductivity is not a desired property, lithium ions are electrostatically adsorbed to the surface of ethylene oxide subunits. Then in step 306, isocyanate-functionalized monomers are reacted with hydroxyl-terminated ethylene oxide subunits. Following step 306, the urethane network including ceramic nanoparticle is embedded into a polypropylene support.

Figure 3:
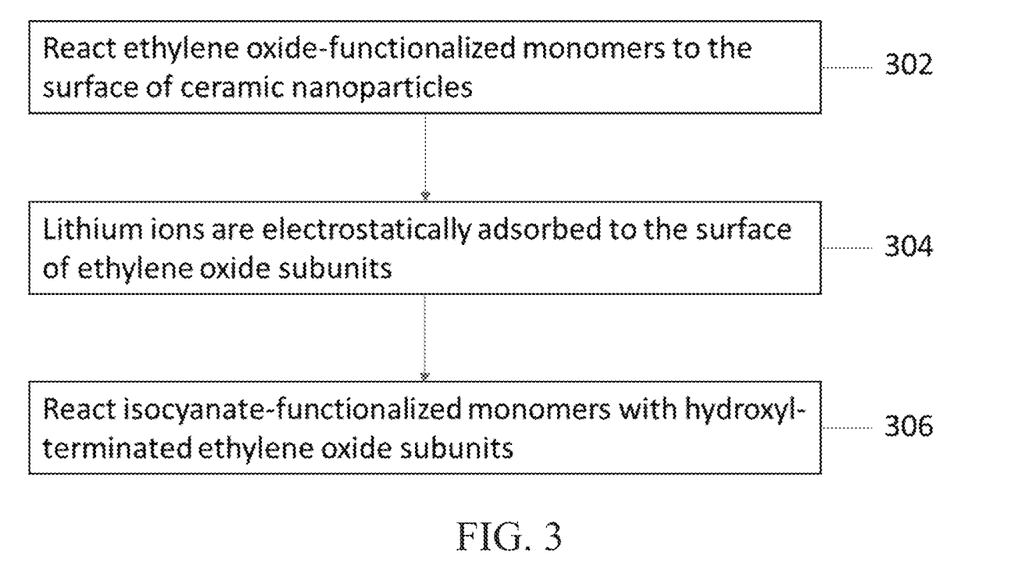
FIG. 3 illustrates one embodiment for a method for producing a ceramic nanoparticle/polymer composite.
Figure 4:
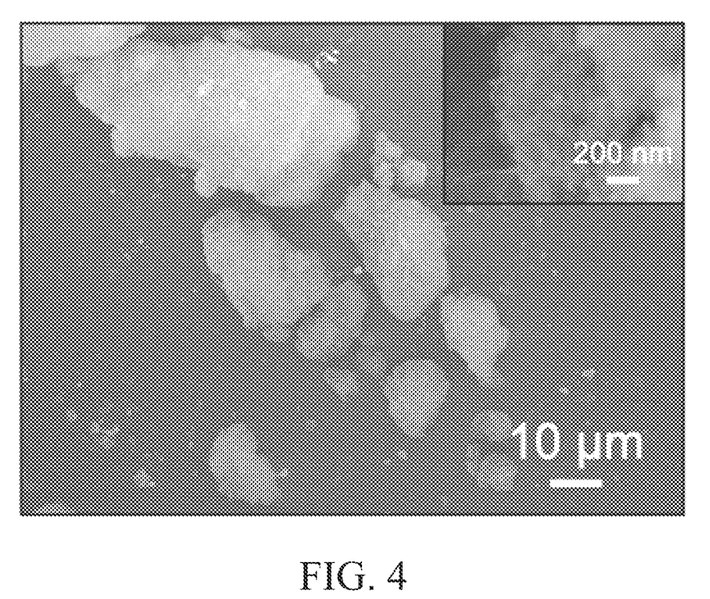
FIG. 4 shows an SEM photomicrograph of surface functionalized ceramic nanoparticle in accordance with one embodiment.

In one embodiment, in step 302, the surface of ceramic nanoparticle is functionalized by reacting an organosilane monomer in a solvent. In some embodiments, as shown by the chemical reaction below, organosilane monomer may be ethylene oxide-functionalized monomer terminated with hydroxyl group, and the solvent may be ethanol. However, any organosilane monomer and suitable solvent may be selected depending on desired properties. FIG. 4 shows an SEM photomicrograph of surface functionalized ceramic nanoparticle in accordance with one example. The surface functionalization of the ceramic nanoparticles allows tighter bonding with PEO, and thereby improves mechanical properties of the resulting membrane. While not described here in detail, a person of ordinary skill in the art would understand that any types of conjugation of organometallic material to ceramics would be acceptable.

If lithium ion conductivity is desired for certain applications, in step 304, the functionalized ceramic nanoparticles may be further processed to electrostatically adsorb lithium ions to the surface of ethylene oxide subunits by a strong electrostatic force. In one example, as shown in the reaction below, aqueous lithium nitrate (LiNO$_3$) solution may be used with ammonium hydroxide (NH$_3$OH) to electrostatically adsorb lithium ions to the surface of ethylene oxide subunits. However, it is to be understand any solution deemed suitable by a person of ordinary skill in the art may be used. Through step 4, ion conductivity of the resulting membrane is improved.

In step 306, as shown by an exemplary chemical reaction below, isocyanate-functionalized monomer such as urethane may be reacted with hydroxyl-terminated ethylene oxide subunits to form a polymer network, thereby forming a composite exhibits enhanced mechanical properties and lithium ion conductivity.

The porous polymer framework is then filled, specifically the pores, with lithium ion conducting particles. In one embodiment, the lithium ion conducting particles can be uniformly dispersed in a precursor solution or slurry that can cure at room-temperature into a flexible solid film upon solvent evaporation, or a mixture of pre-polymers with reactive end moieties that react at room-temperature (e.g., "click chemistries") to form a solid covalent network. To ensure structural integrity of the resulting membrane, the interface of polymer and solid ion conducting phases must be in intimate contact (i.e., no spaces or gaps for either electrolyte solvents to diffuse into via capillary forces) via either covalent bonding or noncovalent intermolecular forces of attraction such as van der Waals forces between the polymeric frame and the surfaces of the ion-conducting particles. Other methods to prepare such membranes include: the inorganic component may be extruded as a concentrated slurry in a fast-evaporating solvent, or may be cast onto the pre-fabricated polymer framework, which may then be followed by an encapsulation step to make sure the lithium ion conducting phases do not leach from the membrane and into either electrolyte compartments.

Figure 5:
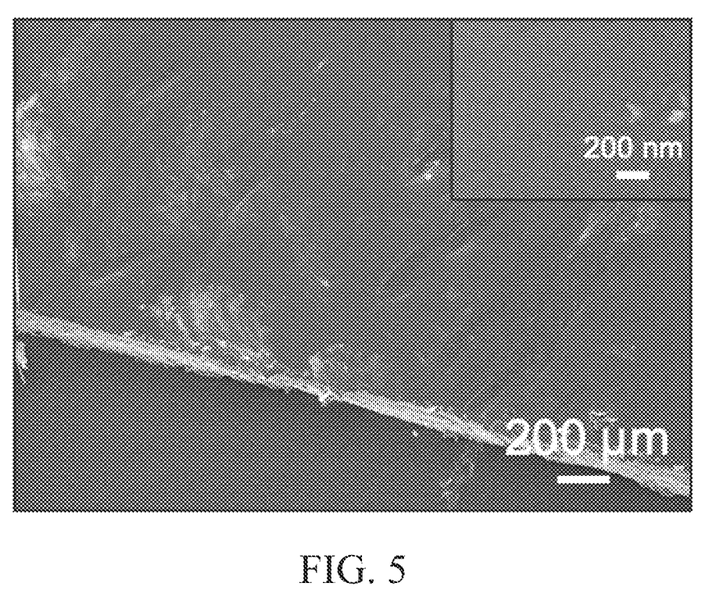
FIG. 5 shows an SEM photomicrograph of ceramic/polymer composite membrane in accordance with one embodiment.
Figure 6A:
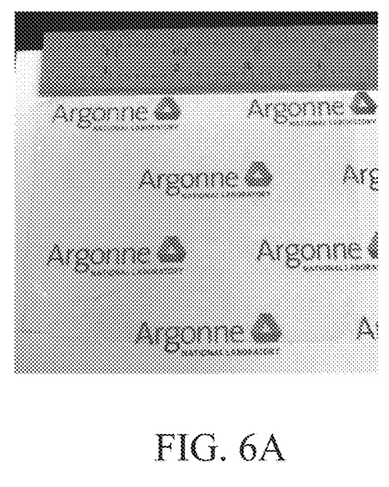
FIGS. 6A and 6B are photographs of transparent polymer membranes synthesized using the method disclosed in the present application in accordance with one embodiment.
Figure 6B:
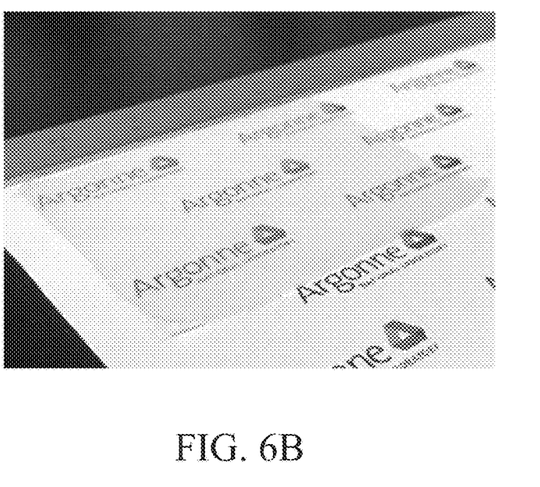

FIG. 5 shows SEM photomicrograph of a membrane including ceramic nanoparticle/polymer composite, in accordance with one embodiment of the present disclosure. The integration of a urethane network, which exhibits excellent stability in water, improves robustness of the membrane toward water. For example, the composite membrane produced in accordance with the method disclosed herein can remain intact in water for at least five days.

The composition, size, and amount of ceramic nanoparticles may be tailored to achieve desired thermal, electronic, and/or optical properties in the resulting composite. For example, the size of the ceramic nanoparticles may have a diameter of approximately 3-100 nm. The ceramic nanoparticle/urethane composite may contain approximately 0.5-30 wt % of ceramic nanoparticles. The ceramic nanoparticles may be selected from $SiO_2$, $Al_2O_3$, $VO_x$, $V_2O_3$, $TiO_2$, $BaTiO_2$, CaO, ZnO, $Fe_2O_3$, $Mn_3O_4$, $Cu_2O$, $In_2O_3$, NiO, CoO, or any other compositions considered suitable by a person of ordinary skill in the art.

As shown in FIGS. 6A-9, the polymer-ceramic composite membrane disclosed herein is flexible, robust, and transparent. Specifically, the polymer-ceramic composite membrane disclosed herein is optically transparent in the visible light regime 80% transmittance) and ionically conductive 10-5 S/cm at room temperature). These features are further illustrated by FIGS. 6A and 6B, which are photographs of transparent polymer membranes synthesized using the method disclosed in the present application in accordance with one embodiment, and the experimental results shown Table 1 and FIG. 8.

Figure 7A:
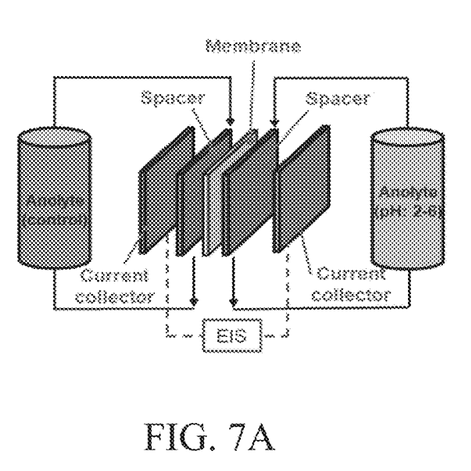
FIG. 7A shows a schematic diagram of experimental setup for testing the membrane robustness using electrochemical impedance spectroscopy.
Figure 7B:
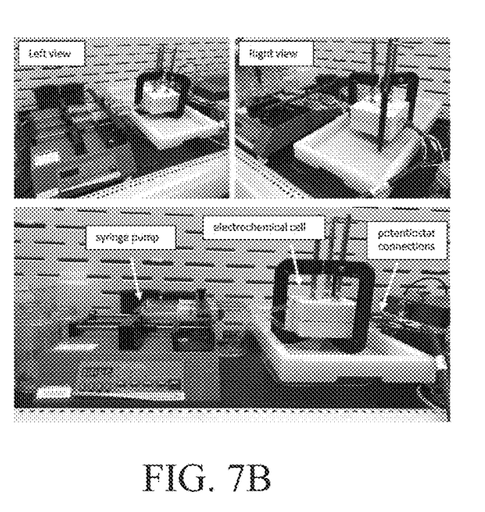
FIG. 7B shows photographs of experimental setup of FIG. 7A.

Electrochemical impedance spectroscopy ("EIS") is a well-known characterization technique in which the ion transport properties a membrane can be characterized using low amplitude alternating current (AC) voltages over a range of frequencies. FIG. 7A shows a schematic diagram of experimental setup for testing the membrane robustness using EIS, and FIG. 7B shows photographs of experimental setup of FIG. 7A. The typical setup includes three electrodes: a working electrode of the desired system, a counter electrode, and an independent reference electrode. Graphite and platinum group materials are commonly used as the counter electrode whereas silver or silver chloride (AgCl) are commonly used as the independent reference electrode. A person of ordinary skill in the art would easily understand any other suitable materials may be used as electrodes.

Once the electrodes are mounted, the electrochemical cell may be filled with the electrolyte. Typically, anolyte having pH of between 2 and 6 are used. In this experiment, the anolyte of 0.5M $Li_2CO_3$ in $H_2O$ with $H_2SO_4$ having a pH of approximately 6 was used. Measurements were made with membrane at 1 minute, 400 minutes, 1000 minutes, 1600 minutes, 45000 minutes, and without membrane. The experimental measurements are summarized below in Table 1:

TABLE 1

| Experiment | Resistance ($\Omega$) | Total Ionic Conductivity (S/cm) |
|---|---|---|
| t = 1 min | 12500 | $1.5 \times 10^{-5}$ |
| t = 400 min | 13000 | $1.4 \times 10^{-5}$ |
| t = 1000 min | 11000 | $1.7 \times 10^{-5}$ |
| t = 1600 min | 10500 | $1.8 \times 10^{-5}$ |
| t = 45000 min | 10400 | $1.8 \times 10^{-5}$ |
| No membrane | 900 | $2.1 \times 10^{-4}$ |

Figure 8:
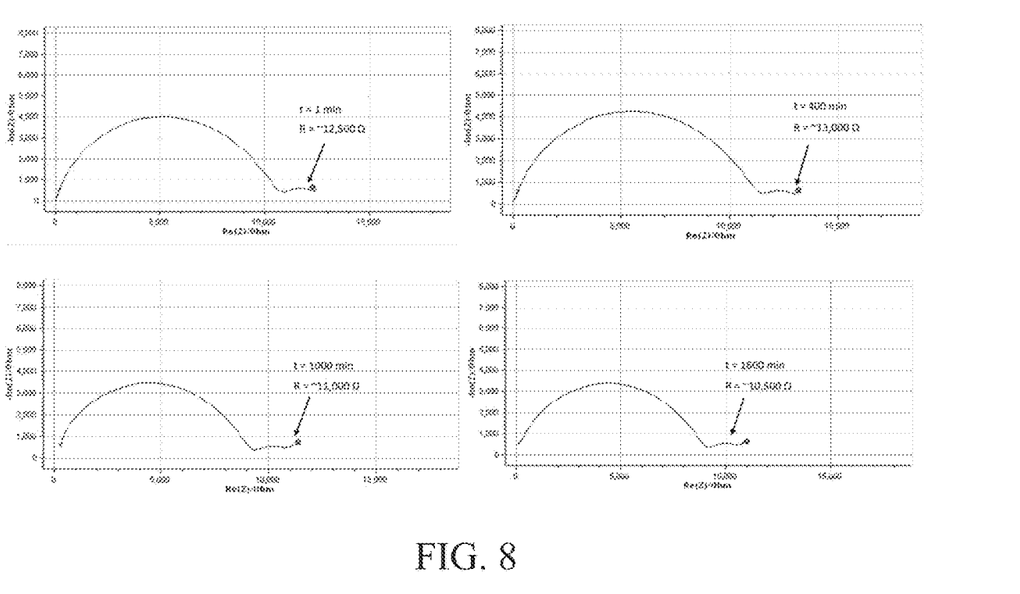
FIG. 8 shows experimental results of membrane robustness of transparent polymer membranes synthesized using the method in accordance with one embodiment.
Figure 9:
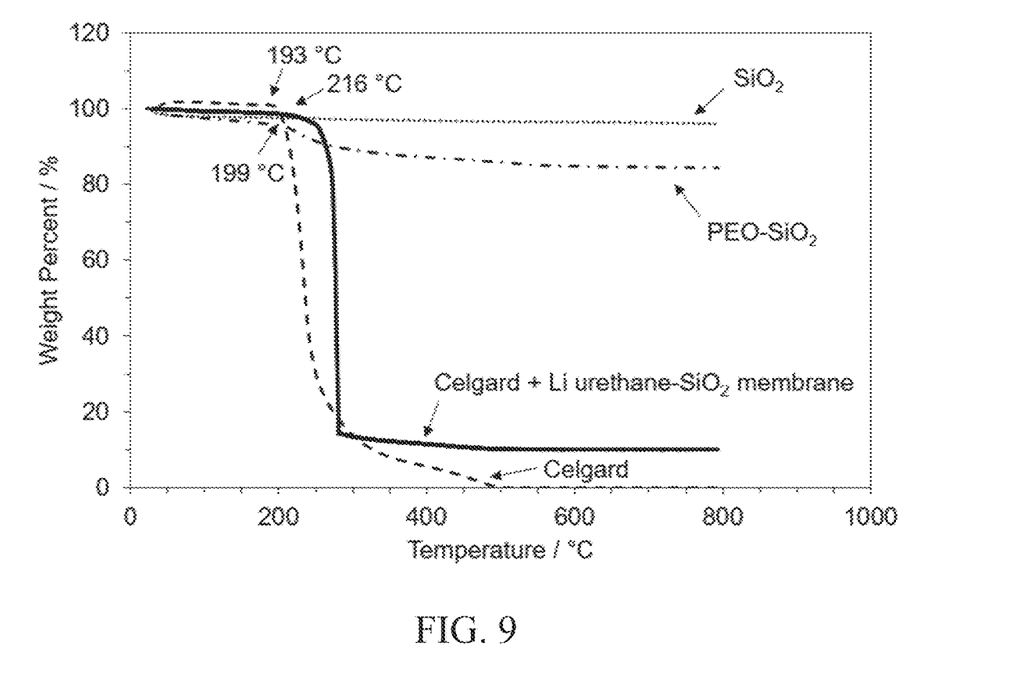
FIG. 9 shows a comparison of thermal properties of various membrane materials in accordance with one embodiment.

FIG. 8 shows Nyquist plots of the measurements taken above at t=1 min, 400 min, 1000 min, and 1600 min. The polymer-ceramic composite membrane further has enhanced mechanical properties, higher lithium ion conductivity, and thermal stability. Specifically, FIG. 9 shows comparison of thermal properties, specifically thermal stability, of various lithium conducting membranes. As illustrated by FIG. 9, ceramic nanoparticle/urethane composite synthesized in accordance with one embodiment of the present disclosure exhibits improved thermal stability up to 216° C. compared to 193° C. and 199° C. of Celgard polypropylene and Celgard including ceramic nanoparticle/polymer membrane disclosed herein, respectively.

In some embodiments, the membrane may coated with an inorganic material on one or both sides, or deposited within the membrane's polymer domains, to reduce undesired swelling upon immersion in both aqueous and organic media. The inorganic material may be deposited by atomic layer deposition ("ALD"), sequential infiltration synthesis ("SIS"), spray coating, physical vapor deposition ("PVD") or any other method that may be considered suitable by a person of ordinary skill in the art. The inorganic material may be deposited to a thickness of 1 to 10,000 atoms, such as 1-2,000, 1-1,000, 1-100, 10-100, and 10-1000 atoms thick.

The membranes can be further functionalized via ALD and SIS, to alter additional properties of the membrane, for example hydrophobicity/hydrophilicity or current flow or ion permeability, as well as to tune wetting properties and dielectric stability.

In one embodiment, an alumina overcoat is applied to a membrane and is sufficiently thin to allow ion transport through the overcoat. For example, 30 cycles of alumina to deposit a 4 nm thick overcoat, such as on one side or both sides of the membrane.

In another embodiment, zinc oxide overcoat is applied to a membrane and is sufficiently thin to allow ion transport through the overcoat. For example, 30 cycles of zinc oxide to deposit 4 nm thick overcoat, such as on one side or both sides of the membrane.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

I claim:

1. A method of making a polymer-ceramic composite membrane comprising:
forming an urethane polymer scaffold having a plurality of through-pores;
forming a ceramic nanoparticle/polymer composite by:
reacting ethylene oxide-functionalized monomers to a surface of a ceramic nanoparticle; and
reacting isocyanate-functionalized monomers with hydroxyl-terminated ethylene oxide subunits; and
integrating the ceramic nanoparticle/polymer composite into the polymer scaffold.

2. The method of claim 1, further comprising electrically adsorbing lithium ions to a surface of ethylene oxide subunits prior to reacting the monomer with the hydroxl-terminated subunit.

3. The method of claim 1, wherein forming the polymer scaffold comprises 3-D printing.

4. The method of claim 1, wherein each through-pore of the plurality of through-pores has a diameter of 10-5000 nm.

5. The method of claim 1, wherein a ceramic nanoparticle of the ceramic nanoparticle/polymer composite has a diameter of 3-100 nm.

6. The method of claim 1, wherein a ceramic nanoparticle of the ceramic nanoparticle/polymer composite comprises a material selected from the group consisting of silicon dioxide ($SiO_2$), aluminum oxide ($Al_2O_3$), vanadium oxide ($VO_x$), and titanium dioxide ($TiO_2$).

7. The method of claim 1, wherein the ceramic nanoparticle/polymer composite comprises 0.5-30 wt % of ceramic nanoparticles.

* * * * *